US008638362B1

(12) United States Patent  
Thompson et al.

(10) Patent No.: US 8,638,362 B1  
(45) Date of Patent: Jan. 28, 2014

(54) ACOUSTIC VIDEO CAMERA AND SYSTEMS INCORPORATING ACOUSTIC VIDEO CAMERAS

(75) Inventors: R. Lee Thompson, Kirkland, WA (US); Jason L. Seawall, Seattle, WA (US); Scott T. Bachelor, Poulsbo, WA (US)

(73) Assignee: Teledyne Blueview, Inc., Seattle, WA (US)

( * ) Notice: Subject to any disclaimer, the term of this patent is extended or adjusted under 35 U.S.C. 154(b) by 1224 days.

(21) Appl. No.: 12/125,025

(22) Filed: May 21, 2008

Related U.S. Application Data

(60) Provisional application No. 60/939,316, filed on May 21, 2007.

(51) Int. Cl.  
*H04N 7/18* (2006.01)

(52) U.S. Cl.  
USPC .............................................. 348/81; 348/159

(58) Field of Classification Search  
USPC ............................................................ 348/81  
See application file for complete search history.

(56) References Cited

U.S. PATENT DOCUMENTS

| | | | | |
|---|---|---|---|---|
| 3,688,029 | A * | 8/1972 | Bartoe et al. | 348/81 |
| 4,105,990 | A * | 8/1978 | Rines et al. | 367/96 |
| 4,381,144 | A * | 4/1983 | Breslau | 396/27 |
| 4,396,944 | A * | 8/1983 | McKenney et al. | 348/141 |
| 5,231,609 | A * | 7/1993 | Gaer | 367/99 |
| 5,594,707 | A * | 1/1997 | Goto et al. | 367/111 |
| 6,226,227 | B1 | 5/2001 | Lent et al. | |
| 6,707,761 | B2 * | 3/2004 | Erikson | 367/131 |
| 6,856,342 | B1 * | 2/2005 | Raposa et al. | 348/81 |
| 7,417,666 | B2 * | 8/2008 | Kaltenbacher et al. | 348/81 |
| 7,496,226 | B2 * | 2/2009 | Negahdaripour et al. | 382/154 |
| 7,609,290 | B2 * | 10/2009 | McEwan | 348/36 |
| 2001/0048468 | A1 * | 12/2001 | Fantone et al. | 348/81 |
| 2002/0024594 | A1 * | 2/2002 | Yamamuro | 348/81 |
| 2003/0067542 | A1 * | 4/2003 | Monroe | 348/148 |
| 2003/0081934 | A1 * | 5/2003 | Kirmuss | 386/46 |
| 2005/0007882 | A1 * | 1/2005 | Bachelor et al. | 367/103 |
| 2005/0036404 | A1 * | 2/2005 | Zhu et al. | 367/88 |
| 2005/0190263 | A1 * | 9/2005 | Monroe et al. | 348/159 |
| 2007/0291589 | A1 * | 12/2007 | Kawabata et al. | 367/88 |
| 2008/0080317 | A1 * | 4/2008 | Inouchi et al. | 367/112 |
| 2008/0127736 | A1 * | 6/2008 | Berman | 73/662 |

OTHER PUBLICATIONS

Thompson, Roger et al., U.S. Appl. No. 11/829,822, filed Jul. 27, 2007.

* cited by examiner

*Primary Examiner* — Andy Rao  
*Assistant Examiner* — James Edwards  
(74) *Attorney, Agent, or Firm* — Ann W. Speckman; Speckman Law Group PLLC

(57) ABSTRACT

An acoustic video camera system uses acoustic data acquisition systems to produce digital video imagery capable of interfacing with host equipment that operates using standard video formats compatible with video images obtained using optical systems. The acoustic video camera comprises an Acoustic Imager, a Digital Image Compression Component, an I/O and Processing component, and, optionally, an Image Analytics Component. System analytics may provide automated target identification and tracking. All of these components may be incorporated in a submersible acoustic imaging unit having communications capability for interfacing with a host display and control system.

21 Claims, 3 Drawing Sheets

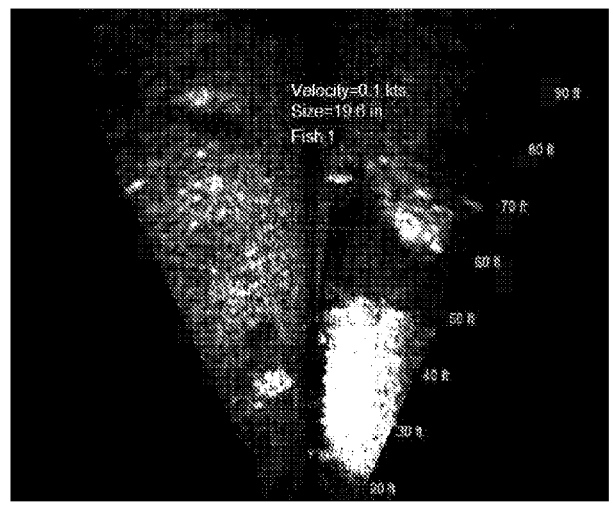
FIGURE 5
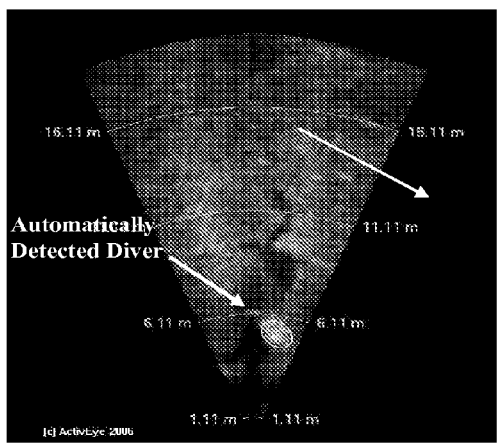    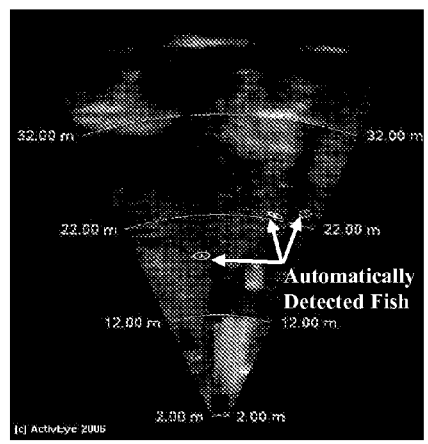
FIGURE 6A              FIGURE 6B

ACOUSTIC VIDEO CAMERA AND SYSTEMS INCORPORATING ACOUSTIC VIDEO CAMERAS

CROSS REFERENCE TO RELATED APPLICATION

This application claims priority under 35 U.S.C. §119(e) to U.S. Provisional Patent Application No. 60/939,316, filed May 21, 2007.

FIELD OF THE INVENTION

The present invention relates generally to systems for producing images on an intermittent or substantially continuous basis, such as streaming digital video images, using acoustic arrays and sonar systems. The acoustic video systems generally incorporate a digital conversion component and output images in a digital format that can be used in underwater monitoring systems and integrated in systems that are capable of displaying and processing output from both acoustic imaging systems and optical imaging systems.

BACKGROUND OF THE INVENTION

Optical video cameras are well known and have been in use for many years. Underwater optical video cameras generally use analog or digital video transmission and can provide satisfactory resolution and viewing range in generally clear underwater conditions. Conventional optical video cameras, however, have limited viewing range in murky and turbid underwater conditions.

High resolution imaging sonar systems have been available and used in many different underwater applications. Sonar imaging systems provide satisfactory resolution and viewing range in many different water conditions, including murky and turbid underwater conditions. A significant challenge in using sonar imaging systems in underwater surveillance applications, however, is that sonar images can be difficult to interpret and may require expertise and training to interpret accurately.

Automated image analysis, identification and surveillance routines have been developed for use with various types of digital image formats, including digital image formats typically used with video images acquired using optical video systems. Sonar imaging systems are generally difficult to integrate into existing image analysis systems that are compatible with digital video formats typically used with optical video systems, and analytical tools commonly used for automated identification and surveillance aren't generally compatible with sonar image formats. For this reason, sonar imaging systems generally haven't been adopted as replacements for optical video cameras, even in underwater applications where sonar imaging systems would provide improved imaging range in a variety of water conditions.

The acoustic video camera systems of the present invention are directed to providing imagery acquired using acoustic image acquisition systems and output in a format in which the images are compatible with host processing and display systems providing integrated monitoring and surveillance functions.

SUMMARY OF THE INVENTION

Acoustic video cameras of the present invention use acoustic systems for acquiring imaging data and incorporate components that process the acquired data and output it in a format in which it is capable of interfacing with host equipment such as image display and monitoring systems that operate using standard video formats compatible with video images obtained using optical techniques. Acoustic video cameras, in this embodiment, incorporate an acoustic imager, a digital image compression component, an I/O and Processing component, and an Optional Onboard Image Analytics component.

The Acoustic Imager component comprises acoustic transmit/receive array(s) integrated with or connected to appropriate transmit/receive electronics and collects real-time or archival acoustic images on an intermittent or substantially continuous basis. The Digital Image Compression component collects real-time and/or archival acoustic image data and compresses it using Digital Image Compression routines and formats that are compatible with digital image display and processing systems designed for displaying and processing images obtained using optical technologies. Several standardized digital imaging formats are known and may be used. In one embodiment, standard S-video, Composite, and IP camera output formats may be available from each acoustic video camera.

The I/O and Processing component of acoustic video cameras of the present invention interfaces with host equipment such as image display, processing and analytics devices through standard video communication techniques and/or other digital or analog methods. Various data transmission and communications capabilities, such as RF-based communications, wireless (e.g., WiFi) communications, and the like may be incorporated in the acoustic video cameras, allowing high speed and high fidelity communications between distributed acoustic video cameras, between acoustic video cameras and host systems, and between acoustic video cameras and other components, such as optical video cameras, comprising a monitoring system.

Because the acoustic video camera produces images in a digital format that is compatible with digital images acquired using optical technologies, acoustic imaging systems of the present invention may be used in combination with, or may replace, optical image acquisition devices that perform inadequately in underwater applications. The conversion of acoustic imaging output to a format compatible with digital imaging analytics used with standard digital images acquired using optical cameras enables "plug and play" use and interchange of optical camera and acoustic camera systems, allowing rapid deployment and adjustment to different environments and conditions.

According to one embodiment, the at least one transmit and/or receive array, the transmit and receive electronics, the digital image compression component, and the (optional) digital analytics component are mounted in an integrated, submersible acoustic imaging head. This system configuration provides digital image formatting and, optionally, analytics, within the acoustic video camera unit, and provides communication of digital images, optionally including detection and tracking analytics, to a centralized (generally remote) host system. Distributed monitoring systems incorporating multiple acoustic image acquisition systems having integrated digital image compression and analytics components, configured so that each of the distributed monitoring systems communicates with a central host system, have improved reliability, since failures in the individual distributed image acquisition systems have a limited impact on the centralized host system. Multiple fixed and/or mobile underwater surveillance sensor nodes (e.g. acoustic image acquisition devices) may be connected to a common host system using RF or wireless communications.

The ability to convert acoustic images to standard digital "video" formats allows acoustic imaging systems (e.g. sonar systems) to be employed, alone or in combination with optical imaging systems (e.g. optical video systems) in monitoring systems. Such monitoring systems may, for example, incorporate underwater acoustic imaging systems and above water, air or ground-based optical "video" imaging systems to present comprehensive underwater and overwater information to a centralized data/monitoring image display station for managing both wet and dry surveillance.

An Optional Onboard Image Analytics component may be provided to apply image processing to the real-time or archival imagery. Automated systems and algorithms are available, for example, for detecting critical image information such as moving objects in images in a standard video format. Images acquired using acoustic systems and techniques and converted to standardized digital "video" formats in acoustic imaging systems of the present invention may employ existing monitoring systems and algorithms for mining information from the images and detecting changes over time, such as moving objects. This information may then be displayed, announced, etc. through the interface with a host system providing a user interface. When critical features or changes are detected in images or over time in streaming images, the host system may implement programmed or programmable alarms, and the like. Disclosed acoustic video systems of the present invention can leverage extensive investment in development of optical video analytics to develop target detection and tracking routines, such as rapid fielding of existing detection & tracking solutions; motion, target counting, and target behavior based alarms; sophisticated zone and policy-based alarms; automatic target tracking between multiple heads; secure, web-based view and control from any networked PC; alarm activated automated actions such has locking doors and turning on lights or notifications via email, text message, pager, and the like; flexible record and playback options (record, scheduled record, alarm and pre-alarm record, and playback during record).

Acoustic imaging systems of the present invention may also integrate navigational sensors or data acquisition devices, GPS systems and the like. Acoustic data acquisition systems of the present invention may, for example, incorporate GPS and compass components that, in combination with communications capabilities, provide acoustic imaging systems having self-geo-referencing capabilities that can be monitored by a host system. This is self-geo-referencing capability is beneficial and allows deployment of acoustic data acquisition and video camera systems in underwater locations where mounting or tethering to a fixed structure may not be possible or the platform is mobile. Acoustic imaging systems having self-geo-referencing capabilities may be distributed to desired underwater sites quickly and provide feedback to the host system about its location.

BRIEF DESCRIPTION OF THE DRAWINGS

FIG. 5 illustrates a sonar image captured from an acoustic video camera described in Example 2 and illustrates automated tracking of salmon;

FIG. 6A illustrates a screen capture from an acoustic video camera described in Example 3 and illustrates automated detection of a diver; and FIG. 6B illustrates a screen capture from an acoustic video camera described in Example 3 and illustrates automated detection and tracking of multiple salmon at 20 m range, which is comparable to human divers at over 240 ft.

DETAILED DESCRIPTION OF THE INVENTION

Figure 1:
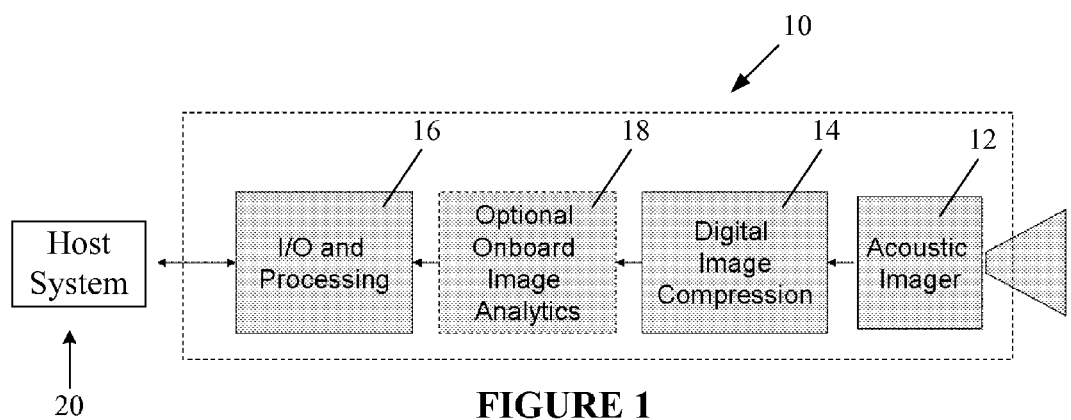
FIG. 1 illustrates a schematic diagram of an embodiment of an acoustic video camera of the present invention that produces digital video imagery using data acquired with an acoustic imager.

An acoustic video camera 10 capable of interfacing with host equipment such as image display and monitoring systems that operate using a standard video format compatible with video images obtained using optical techniques is shown schematically in FIG. 1. Acoustic video camera 10, in this embodiment, comprises an acoustic imager 12 that collects (acoustic) image data at frame rates generally in the range of between 3-10 Hz, a digital image compression component 14 that compresses the imagery to a standardized (or custom) digital format recognizable by a host system, and an I/O and Processing component 16 providing an interface for communication with a host system 20, which may be provided at a remote location, and which may interface with a plurality of input devices. Acoustic video camera 10 may additionally comprise an Optional Onboard Image Analytics component 18 that provides a range of data processing and analytics capabilities. When analytics component 18 is implemented before I/O component 16, it may monitor the acoustic image stream to detect pre-defined objects or features, to track pre-defined objects or features, and trigger alarms, begin transmission or data collection, initiate additional processing, or other functions. The components comprising acoustic video camera 10 are preferably housed in a submersible, watertight housing suitable for long-term underwater use.

The Acoustic Imager component 12 collects real-time or archival Acoustic images. The acoustic imaging devices are primarily horizontally and/or vertically oriented 2D sonar or 3D sonar. These systems can generate full images either within a single pulse or very quickly in a mechanically scanned mode, such that the motion of a sensor platform or target does not significantly affect the acquired image. They generally produce multiple frames per second and provide high quality, high resolution imagery of underwater scenes. The Acoustic Imager component may produce either 2D images, 2D surfaces in 3D space, or 3D volumetric images. An Acoustic Imager may be beam formed with time frequency-based, conventional time and/or phase-delay-based beam forming techniques, or lens-based beam forming techniques. The images can be unfocused, fixed focus, or variable focal range. The acoustic imaging system may be used with mechanical scanning techniques such as rotational scanning motors or translational motor or vehicle motion to collect data and generate images. Exemplary acoustic imager components are described in detail in U.S. Patent Publication US 2005/0007882 A1, which is incorporated herein by reference in its entirety.

The Digital Image Compression component 14 collects and compresses real-time or archival imagery using Digital Image Compression routines. Digital compression is any technique that converts an image or image data into a new data format that can be converted back into a comparable image or image data format with or without information loss. The technique will ideally reduce memory requirements for storage by a maximum amount and reduce data loss to a minimum. In addition, a compression routine may convert an image stream into an industry standard video stream format such that decompression and display or processing of the sonar imagery can easily be achieved using standard video processing and display systems. Implementing such a compression technique provides uniquely seamless ("plug and play") integration with video surveillance systems. Exemplary video compression and decompression formats (CO-DECs) suitable for implementation in digital image compression components of the present invention include (but are not limited to) one or more of the following: H.261, MPEG-1, MPEG-2, H.263, Indeo, Cinepak, Sorenson Spark, MPEG-4, AVC, Sorenson 3, Theora, WMV, and VC-1. There are many other variants and digital image compression and decompression routines that may be developed and used. The choice of any specific compression routine may depend on compression power, speed, and fidelity involved or required for specific applications.

The I/O and Processing component 16 interfaces with a host system 20 through standard video communication techniques and/or other digital or analog methods. It transmits control information from host system 20 to the acoustic video camera and it transmits compressed (or uncompressed) acoustic image data from the acoustic video camera to the host system. The I/O and Processing component 16 may also apply conversion and encryption routines as part of the processing and transmission. The I/O component can be fashioned as a hard wired connection in serial or parallel formats, or it may be provided with wireless, satellite, or modem connections. The I/O may also be implemented as an analog transmission. It may have the capability of communicating using common protocols such as Ethernet, S-video, RGB, Composite video, USB, RS485, and the like. The processing may reside at the beginning of transmission, at the end of transmission, or on both sides of the transmission.

The Optional Onboard Image Analytics component 18 applies image processing to the real-time or archival acoustic imagery to detect critical image information and anomalies such as moving objects. The analytics component may have the capability to detect, track, and classify specific features and objects in the imagery and is implemented in the submersible Acoustic Video Camera unit. This provides automatic detection of areas and actions of interest in accordance with pre-defined programs, rules, routines, and the like. It also reduces manpower requirements and I/O data bandwidth requirements for a surveillance system. The imagery analytics may be implemented on onboard FPGA, ASIC, Dedicated Signal Processors (DSPs) or other embedded processors including single board computers. The imagery analytics may be custom developed for specific imaging systems. Alternatively, because the acoustic video camera of the present invention produces images generated using acoustic data in a digital format that is compatible with standard optical digital image processing and analytics components, the Optional Onboard Image Analytics component may comprise pre-written modified or unmodified routines developed for optical video surveillance cameras.

The Acoustic Imager hardware generally contains the Digital Compression routines. The Acoustic Imager is connected to the I/O and Processing. The optional onboard analytics resides in part or fully on the Acoustic Video Camera. The digital compression can also be implemented as a separate compressor/converter module that converts the Acoustic Imager data into an industry standard video stream. The Acoustic Imager may also contain some of the processing that facilitates the I/O function. Ideally the Optional Onboard Analytics is implemented entirely before the I/O function, but components of the analytics may be split across the I/O function.

Figure 2:
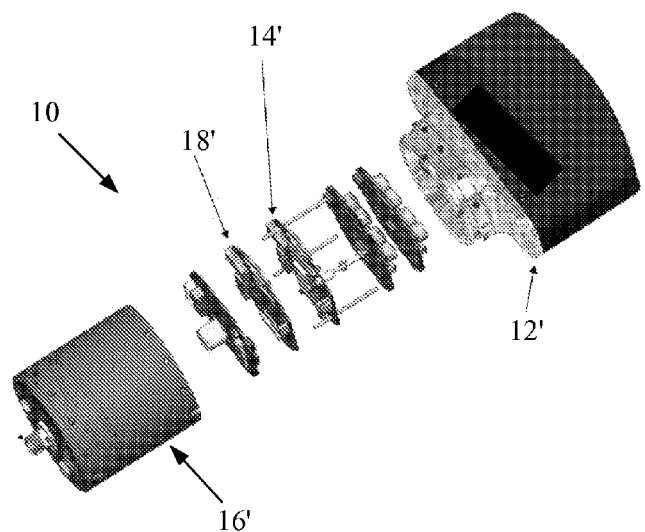
FIG. 2 illustrates an illustrative diagram showing an acoustic video camera of the present invention.

FIG. 2 presents a schematic diagram showing an exemplary acoustic video camera 10' comprising an acoustic imaging head 12', a digital image compression component 14', I/O and Processing component 16' and optional onboard analytics component 18'. In this system, acoustic imaging head comprises a frequency steered underwater imager such as disclosed in U.S. Patent Publication US 2005/0007882 A1, which is incorporated herein by reference in its entirety. A P450 miniature multibeam imaging sonar available from BlueView Technologies, 2151 N. Northlake Way, Suite 101, Seattle Wash. 98103, www.blueviewtech.com) is suitable. This imaging sonar provides a wide (at least 45°) field of view and operates at 450 kHz, which provides high resolution imaging and target detection to ranges of 150 m. Digital image compression component 14' comprises an onboard beam forming, compression, and video conversion card. Exemplary components are available and provide digital image compression and decompression to a standardized format (CODEC) such as H.261, MPEG-1, MPEG-2, H.263, Indeo, Cinepak, Sorenson Spark, MPEG-4, AVC, Sorenson 3, Theora, WMV, VC-1, and many other variants. The compression format used may depend on a number of factors, including compression power, speed, and fidelity.

I/O and Processing component 16' provides industry-standard, Ethernet-based control and high speed data transmission, industry-standard video camera interfaces such as S-video, Composite and IP camera emulations, and may also provide output to control additional features, such as pan and tilt maneuvering features. Onboard Image Analytics component 18' preferably comprises an onboard sonar video analytics card providing distributed intelligence for improved scalability, flexibility and performance.

Figure 3:
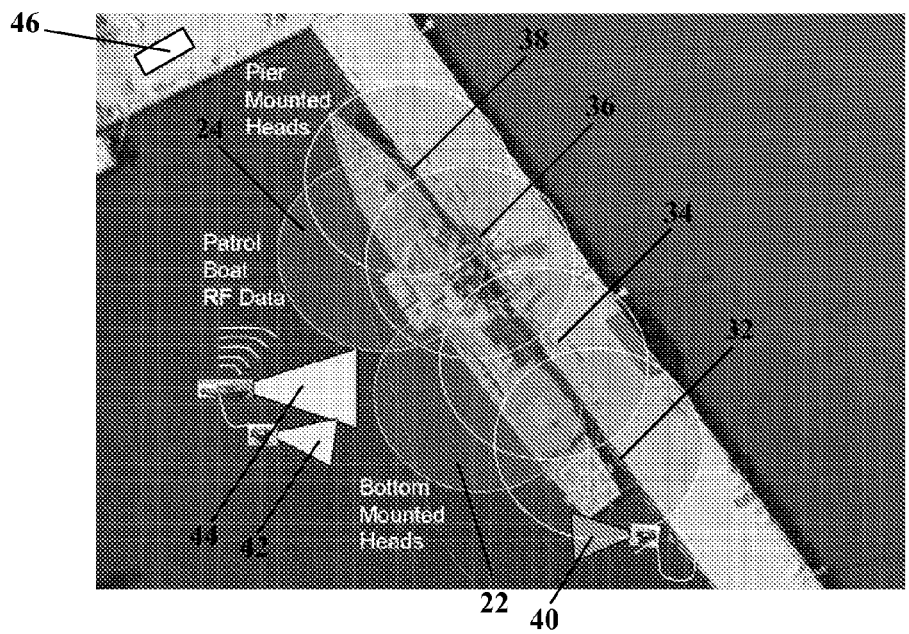
FIG. 3 illustrates an embodiment of a distributed surveillance system incorporating a plurality of fixed or mobile acoustic video cameras of the present invention that interface with a centralized monitoring station.

Multiple acoustic imaging acquisition systems may be assembled and used, in a distributed system, with a common display and controller system. FIG. 3 schematically illustrates a distributed underwater surveillance system in which multiple acoustic image acquisition systems are distributed to provide underwater monitoring or surveillance of a generally large area, such as the area including and surrounding a the hull of a ship moored to a pier. In this exemplary system, multiple acoustic image acquisition systems 22 and 24 are distributed at locations in the water, such as on the bottom, and are oriented to acquire images within the desired target area. The spatial areas covered by acoustic image acquisition systems 22 and 24 are indicated by the circles, which demonstrate that the image acquisition areas preferably overlap. Additional acoustic image acquisition systems 32, 34, 36, 38, 40, 42 and 44 are mounted (in a stationary or movable condition) to the pier or to another fixed structure and are oriented to acquire images within the desired target areas (illustrated for systems 32, 24, 36 and 38 by the circles). The image acquisition area of some or all of the acoustic image acquisition devices may overlap, as shown.

The individual acoustic image acquisition devices 22, 24, 32, 34, 36, 38, 40, 42 and 44 communicate with a common host system 46, which may be stationary or movable, and may be mounted or mountable on a land-based or water-based system. In the exemplary system illustrated in FIG. 3, host system 46 may be used in a land-based or water-based command and control center. The host display and controller device preferably has processing and display capabilities allowing interrogation and display of images collected individually from the multiple acoustic image acquisition devices, as well as combined/overlaid images. The images acquired from the multiple image acquisition systems may be viewed by and shared across multiple foxed and mobile platforms to facilitate rapid detection, understanding, decisions and response.

The ability to convert acoustic images to standard digital formats that are compatible with systems that display and process images acquired by optical techniques, allows acoustic imaging systems (e.g. sonar systems) to be employed, alone or in combination with optical imaging systems (e.g. optical video systems) in monitoring systems using a common host display/controller system. Such monitoring systems may, for example, incorporate underwater acoustic imaging systems and above water, air or ground-based optical "video" imaging systems to present comprehensive underwater and overwater information to a centralized data/monitoring image display station for managing both wet and dry surveillance.

An Optional Onboard Image Analytics component may be provided to apply image processing to the real-time or archival imagery. Automated systems and algorithms are available, for example, for detecting critical image information such as moving objects in images in a standard video format. Images acquired using acoustic systems and techniques and converted to standardized digital "video" formats in acoustic imaging systems of the present invention may employ existing monitoring systems and algorithms for mining information from the images and detecting changes over time, such as moving objects. This information may then be displayed, announced, etc. through the interface with a host system providing a user interface. When critical features or changes are detected in images or over time in streaming images, the host system may implement programmed or programmable alarms, and the like.

Acoustic imaging systems of the present invention may also integrate GPS/WiFi, navigational sensors or data acquisition devices, and the like. Acoustic data acquisition systems of the present invention may, for example, incorporate WIFI, GPS and compass components that provide self-geo-referencing capabilities. This is beneficial, in that the acoustic data acquisition system may be "tossed in" an underwater site and provide feedback to the host about its location.

The following examples are provided for purposes of illustration and are not intended to limit the invention to any of the disclosed systems or parameters.

Example 1

Acoustic Video Camera Demonstration

Conventional solutions to underwater swimmer detection generally utilize single, long-range (500 m) sonar systems. These systems tend to be expensive, large (crane deployed), stand alone solutions. In addition, because these single point solutions typically attempt to detect swimmers at over 500 m range, they tend to be vulnerable to the strong and dynamic sound velocity profiles and high reverberation levels commonly found in harbors.

A commercial miniature multibeam imaging sonar system (BlueView Technologies P450E available from BlueView Technologies, 2151 N. Northlake Way, Suite 101, Seattle Wash. 98103, www.blueviewtech.com) having the specifications and producing images in the video output formats shown below was operated with a BlueView ProViewer graphical user interface. The acoustic video system was mounted on a floating platform and operated to demonstrate detection of a diver at long range in a complicated port environment.

P450E System Specifications:
Frequency: 450 kHz
Field of View: 45°×15°
Max Range: 450 ft
Beam Width: nominal 1°×15°
Number of Beams: 256
Beam Spacing: 0.18°
Range Resolution: 2 in
Update Rate Up to 10 Hz
Size: 9.6 in×6.9 in×4.0 in
Video output formats: AVI with multiple compression codecs including Indeo 5.1, H.261, H.263, and multiple other formats.

Figure 4:
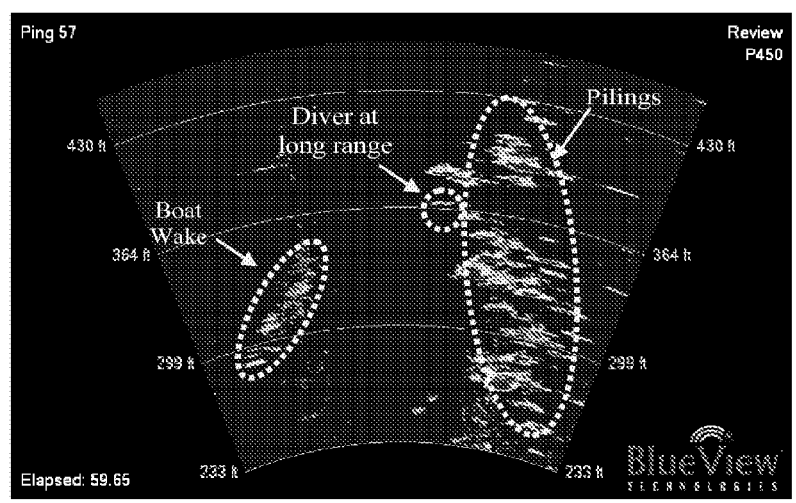
FIG. 4 illustrates a screen capture from an acoustic video camera described in Example 1 and illustrates detection of a diver at long range in a complicated port environment.

A screen capture from a video stream displayed on the user interface demonstrates detection of a diver at long range (approximately 380 ft) and is shown in FIG. 4. The diver's reflection is highlighted by the small dashed circle. Regions in the acoustic video image corresponding to a boat wake, the diver (at long range) and pilings at various ranges are also highlighted. Viewed as a movie, the moving diver target was easily discerned in the video stream swimming near the stationary underwater pier structures. This imagery illustrates the use of a commercial 450 kHz sonar system modified to provide image processing and output images acquired using sonar techniques in standardized video formats to detect and track a target in a complicated environment.

Example 2

Demonstration of Target Detection Using an Acoustic Video Camera

Another optical video compatible sonar system was assembled using a commercial BlueView P450-15 sonar system that was modified to incorporate specially developed analytics algorithms compatible with sonar video imagery to provide detection and tracking of targets. A screen shot from a video stream displayed on the user interface demonstrates detection of a salmon at a relatively short range and is shown in FIG. 5.

Example 3

Demonstration of Automated Target Detection and Tracking Using an Acoustic Video Camera Modified with Standard Video Analytics Capabilities Another optical video compatible sonar system was assembled using a commercial BlueView P450-15 sonar system modified to incorporate off-the-shelf detection and tracking software algorithms for standard CCT video analytics from ActivEye. Commercial video analytics capabilities includes automated detection and classification of behaviors for people and vehicles in CCT camera imagery. Detected targets can be tracked, measured and counted.

FIG. 6A shows a screen shot from a video stream illustrating automated detection and tracking of a diver swimming at close range. The analytics capabilities of the system automatically identify the diver and draw an ellipsoid around the diver in the displayed image.

FIG. 6B shows a screen shot from a video stream illustrating automated detection and tracking of several fish swimming at close range. The analytics capabilities of the system automatically identify multiple fish and draw ellipsoids around the identified fish. Although only a quick demonstration with limited data was conducted, both divers and salmon targets were accurately detected, tracked, and sized using acoustic imaging systems incorporating video analytics software algorithms designed for use with images generated using optical cameras. The operability and success of this system was unexpected.

The disclosed invention has been described with reference to specific embodiments and figures. These specific embodiments should not be construed as limitations on the scope of the invention, but merely as illustrations of exemplary embodiments. It is further understood that many modifications, additions and substitutions may be made to the described instruments, components and kits without departing from the scope of the disclosed invention.

We claim:

1. An acoustic camera system comprising; a sonar system that collects acoustic image data in an underwater environment; a digital image compression component that compresses and formats the acoustic image data to provide digital image output that is compatible with digital image display and processing systems suitable for displaying images obtained using optical technologies; and an industry-standard video camera interface, wherein the acoustic camera system provides direct plug and play compatibility between the sonar system that collects acoustic image data in an underwater environment and digital video display and surveillance systems that are compatible with digital image display and processing systems designed for displaying and processing images obtained using optical technologies; and the digital image compression component is capable of producing at least one of the following types of images: 2D, 2D surfaces in 3D space, and 3D volumetric images.

2. A distributed monitoring system comprising a plurality of acoustic camera systems of claim 1, each of the acoustic camera systems being in communication with a centralized host system having image display capabilities.

3. A distributed monitoring system of claim 2, additionally comprising at least one optical video camera in communication with the host system.

4. The distributed monitoring system of claim 2, wherein at least one of the acoustic camera systems incorporates a self-geo-referencing capability that can be monitored by the host system.

5. The acoustic camera system of claim 1, additionally comprising an image analytics component that applies image processing to the digital image output to detect changes in the images over time.

6. The acoustic camera system of claim 1, additionally comprising an image analytics component that applies image processing to the digital image output for mining information from the images.

7. An acoustic camera system comprising a sonar system having at least one transmit and/or receive acoustic array configured for collecting underwater acoustic image data; a digital image processing component configured for processing the underwater acoustic image data to produce images in a digital image format that is compatible with optical digital image processing and analytics components, wherein the sonar system and the digital image processing component are mounted in an integrated, submersible sonar system housing; and the digital image processing component is capable of producing at least one of the following types of images: 2D, 2D surfaces in 3D space, and 3D volumetric images.

8. An acoustic camera system of claim 7, wherein the digital image processing component provides digital image compression.

9. An acoustic camera system of claim 7, wherein the digital image processing component is provided as a beam forming, compression and video conversion card.

10. An acoustic camera system of claim 7, additionally comprising a digital image analytics component.

11. An acoustic camera system of claim 10, wherein the digital image analytics component integrates analytics capable of detecting moving objects.

12. An acoustic camera system of claim 7, wherein the acoustic transmit and receive array(s) provide a wide field of view greater than 45°.

13. An acoustic camera system of claim 7, additionally comprising output capability for high speed transmission of digital images.

14. An acoustic camera system of claim 7, additionally comprising ethernet-based control and data transmission capability.

15. An acoustic camera system of claim 7 that is capable of interfacing with a monitor displaying digital images output from the acoustic camera system intermittently or on a substantially continuous basis.

16. An acoustic camera system of claim 15, additionally comprising a digital image analytics component incorporating analytics capable of detecting moving objects, and wherein the monitor is capable of displaying digital images output from the acoustic video camera that identify moving objects within an image.

17. An acoustic camera system of claim 15, wherein the analytics component is additionally capable of tracking moving objects, and wherein the monitor is capable of displaying digital images output from the acoustic camera that track moving objects within an image.

18. An acoustic camera system of claim 7, additionally comprising navigational components capable of providing self-geo-referencing data and communications components capable of communicating the self-geo-referencing data to a host system.

19. The acoustic camera system of claim 7, wherein the acoustic data acquisition system comprises a frequency steered underwater imager.

20. The acoustic camera system of claim 7, wherein the acoustic data acquisition system is beam formed using at least one of the following techniques: time frequency beam forming, conventional time and/or phase-delay-based beam forming, and lens-based beam forming.

21. The acoustic camera system of claim 7, wherein the data acquisition system is capable of movement resulting from at least one of the following scanning techniques: rotational scanning motor, translational scanning motor, and vehicle motion.

* * * * *